United States Patent Office 2,964,880
Patented Dec. 20, 1960

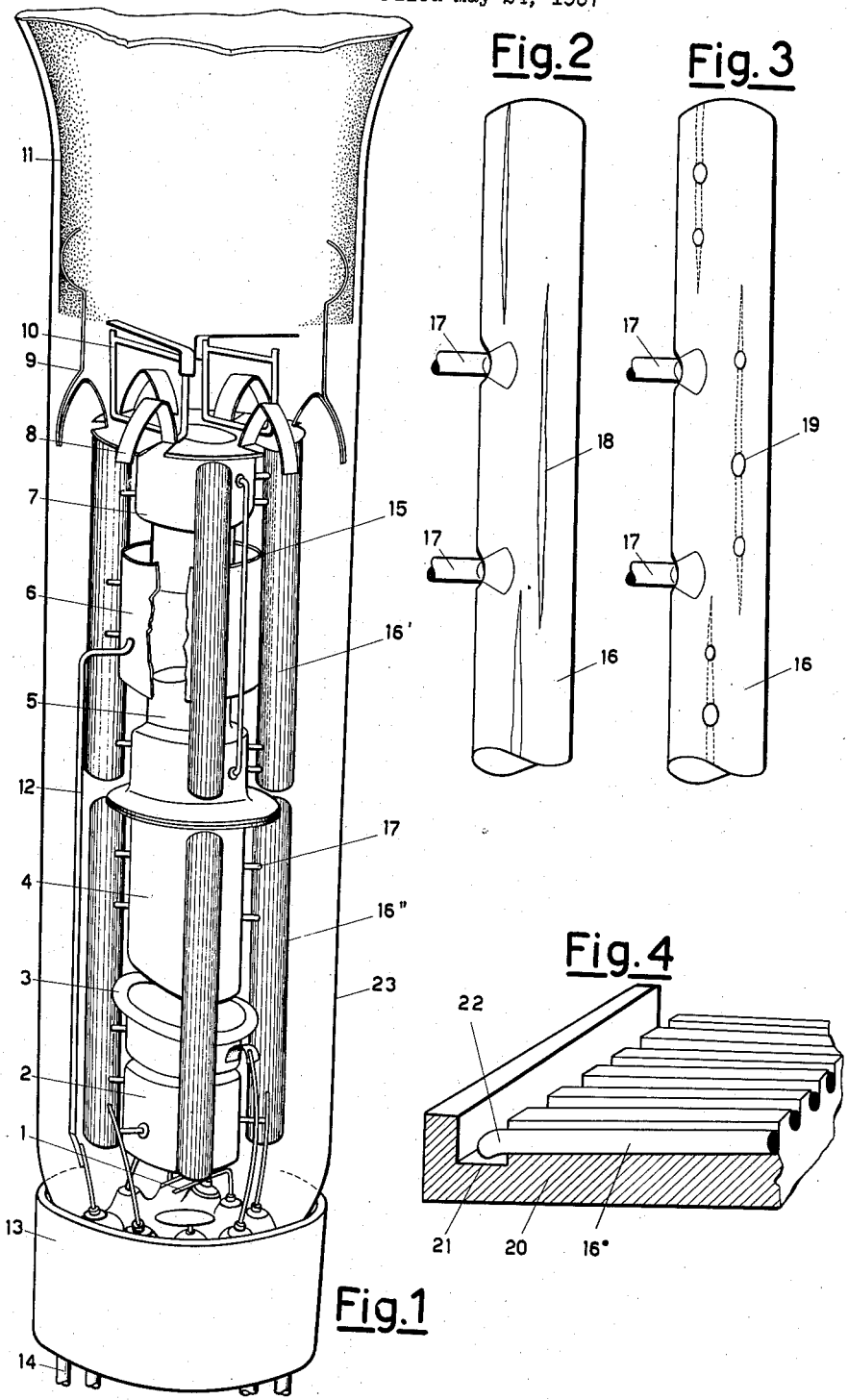

2,964,880
PROCESS FOR PREPARING GLASS ELEMENTS

Gianfranco Cirri, Milan, Italy, assignor to Fabbrica Italiana Valvole Radio Elettriche, Milan, Italy, a company of Italy Filed May 24, 1957, Ser. No. 661,535

Claims priority, application Italy May 25, 1956

4 Claims. (Cl. 49—77)

The present invention relates to a process for homogenizing glass drawn in rods and to rods of homogenized glass for electric insulators adapted to be used at high voltages, and more particularly for kinescopes.

It is well known that glass is widely employed in electrotechnics due on one side to its elevated dielectric characteristics and on the other side to the possibilities it offers if heated, to fix metallic members to its mass.

In order not to be prolix in indicating examples, mention is made only of the wide use of glass in the manufacture of electric lamps, of its intense use for electronic tubes and, nowadays, of its valuable use with cathode ray tubes in general and with kinescopes in particular.

However, to remain—for the sake of clearness—in the field of kinescopes, wherein the various elements composing the electron gun are insulated from one another by means of drawn glass rods, it has been found that with the elevated operating voltages required by these tubes or the like, standard glass drawn in the shape of a rod cracks first and breaks subsequently when the electric voltages to which they are subjected surpass certain values.

The extreme inconvenience of that fact is felt specially with cathode ray tubes in general and with kinescopes in particular where the destruction of the rods as caused by a possible electric flashover renders the whole and costly tube useless.

As will be seen hereinafter the various solutions proposed to overcome this inconvenience (use of special glass or of ceramic insulators) have succeeded only partly in improving the behaviour of insulators, such solutions also involve the essential disadvantage of complex fabrication and high cost.

It is now an object of the present invention to eliminate this inconvenience of the causes which enable electric flashover in rods of standard glass subjected to high voltages and by providing a new process adapted to render said rods insensitive to such electric stresses above all if the operating voltages attain elevated values such as those which occur during the operation of kinescopes or cathode ray tubes.

It has been found, according to one aspect of the invention, that the main cause favoring the occurrence of electric flashover in standard glass rods when the operating voltage or testing voltage surpasses determined limit values resides in the presence of very thin longitudinal air streams in the proximity of the pins fixed in the glass body.

The process according to the invention also results in a large increase in the dielectric properties of standard glass rods with the elimination of the longitudinal air streams. To this end, the present invention proposes that the rods still without pins are to be placed on a special crucible and are then heated in an appropriate furnace at a temperature and for a duration of time sufficient to enable the transformation of longitudinal air pockets into spherical ones so as to compel the maximum volume of air inclusion in the glass to occupy a minimum of space.

The invention will be illustrated with reference to the accompanying drawings in which, in order to make the concepts of the invention clearer and in order to demonstrate the importance of the process according to the invention and of the improved rods obtained therewith, reference is made to a particular application of glass drawn in rods, to kinescopes: Fig. 1 is a perspective view of the electron gun of a kinescope the members of which are carried by metal pins fixed in turn to respective rods; Figs. 2 and 3 represent a conventional rod and an improved rod according to the invention, respectively; and, Fig. 4 is a perspective view of a special crucible developed to carry out the process of homogenizing the glass rods according to the present invention, in practice.

In order better to illustrate the invention, by way of example, the composition of an electron gun for kinescopes with an electrostatic focussing system has been shown in Fig. 1, so as to convey a real idea of the difficult operating conditions under which the glass rods must perform their intended function.

The electrons emitted by the cathode, which is internal with respect to a first grid 2 and heated by a filament 1, are accelerated by a second grid 3 and by an anode 4. The electron beam is focused by the electrooptical system composed of two lenses 5 and 7 and of a focusing cylinder 6. The whole gun is kept centered in the neck of the kinescope 23 by springs 8 which generally are six in number. Other springs 9 make electric contact with the conducting graphite 11 which is connected with an anode button placed on the bulb.

To keep a satisfactory vacuum there are provided the two getters 10. The focusing voltage, which is of the order of magnitude of from 0 to 500 v., is fed to the cylinder 6 by one of the pins 14 of a socket 13, by means of a connection 12. The anode voltage which is about 20,000 v. is brought to the anode 4 by the anode button by means of the graphite 11, the springs 9 and the connection 15. Consequently, there are voltage drops between the cylinder 6 and the lenses 5 and 7, or even between the anode 4 and the second grid 3, of about 20,000 v.

Said voltage should be wholly resisted by the insulating glass rods 16' and 16" to which the individual members are fastened by means of the pins 17.

It has already been stated that those insulators which are made of standard glass drawn in rods are subject to cracking and to breakage owing to the presence of extremely thin longitudinal air inclusions which favor the flashover between the pins fixed in the insulator, when subjected to voltage drops of the order of magnitude of from 15,000 to 25,000 v.

Fig. 2 represents diagrammatically those conditions under which if the pins 17 placed on the same line are near to the air streams or oblong inclusions 18, which are enlarged in the drawing, the flashover as a result of the high voltage occurs with consequent breakage of the rod. The air streams 18 on the other hand are nearly always present since in the process for making standard glass rods the unavoidable air bubbles present in fused glass become stretched to very long inclusions during the drawing operation.

That inconvenience is particularly felt in kinescopes with electrostatic focussing, which are replacing those with electromagnetic focussing to an increasing extent.

The solutions already proposed to eliminate that extreme inconvenience provide either the use of special glass or the use of ceramic insulators.

It should be noted however that none of those systems represents a practically effective and economical solution of the problem.

In fact the use of special glass (e.g. "Multiform" glass) in the manufacture of insulators involves working stages such as powdering, mixing, moulding and sintering of glass, which are very complicated and costly operations. Hence the price of a special glass insulator is four to five times as high as that of a standard glass drawn insulator. Ceramic insulators on the other hand are not suited owing to their higher cost and to the difficulty of attaining the necessary accuracy with large series production and above all owing to the impossibility of fixing the pins in ceramics by fusion of said ceramics.

The present invention affords a method of eliminating the longitudinal air inclusions existing in glass rods in such a way so as to make the glass homogeneous and, therefore, quite suitable for wide use with elevated electric voltages and, in particular, for the manufacture of electron guns for kinescopes. The treatment consists in heating the rods of standard glass drawn in a gas furnace (e.g. in a hydrogen furnace) to a temperature between 1000 and 1100° C. for a time of 5 minutes.

At that temperature it happens that the very thin air streams tend to assume an arrangement whereby the maximum air volume becomes concentrated in a minimum of surface and the bubbles are transformed so as to lose their longitudinal shape and to become spherical, thus eliminating the causes for flashovers.

Fig. 3 shows diagrammatically how the air streams or oblong inclusions 18 represented in Fig. 2 are transformed into bubbles 19 after the treatment according to the invention. In Fig. 4 there is shown a perspective view of a particular graphite crucible conveniently developed according to the invention to carry out the heating operation of the glass rods in a gas furnace. In fact the rods 16 are held in the crucible, shown in section taken along the length of the furnace, in special channels provided in graphite or other materials with which glass does not combine.

Moreover, to prevent the ends of the rods from deforming as a result of shrinking and swelling, a groove 21 has been provided in the crucible 20, according to the invention, for the purpose of compensating the effect of surface tensions as a result of the weight of the projecting end of rod 22. If the length of the crucible is small (e.g. 200–300 mm.) it may be convenient to treat the ends of the rods at the flame prior to putting them into the furnace.

Hence the invention not only consists in the method of heating the standard glass rods to make the air streams disappear but also in the use of a special crucible for holding the glass. This is for the reason that, for instance, it is not possible to heat the glass further only at the time of setting the pins because the rod would deform under the effect of surface tensions until it becomes nearly a ball.

The invention should be understood as not being limited only to the process nor to the examples illustrated in the drawings. Many variants are possible without departing from the principle of the invention.

As for applications, in the description and drawings, reference is made to the specific case of a kinescope. It is evident however that the homogenized rods may be employed advantageously in all the cases in which electric voltages are comparatively high. Laboratory tests have demonstrated that the rods according to the invention resist well voltages above 25 kv.

I claim:

1. A method of improving the longitudinal dielectric characteristic of a rod of glass having elongated enclosures of gases comprising changing the elongated enclosures to spherical enclosures by heating the rod to a temperature of from 1000–1100° C. for about five minutes, supporting the rod during the heating thereof to prevent deformation and cooling the rod.

2. A method of improving the longitudinal dielectric characteristic of a rod of glass having elongated enclosures of gases comprising changing the elongated enclosures to spherical enclosures by placing the rod on a crucible for support of at least a part of the length thereof, heating the rod while supported on the crucible to a temperature of from 1000–1100° C. for about five minutes and then cooling the rod.

3. A method of preparing a glass-metal element comprising fabricating a glass rod adapted to receive therein metal pins extending transversely of the rod, there resulting in the rod elongated enclosures of gas extending between and past the pins, comprising heating the entire rod to a temperature between substantially 1000° to 1100° C. for substantially five minutes to convert the elongated enclosures to spherical enclosures thereby concentrating the enclosures of gas within a minimum of surface and supporting the rod along at least part of its length during said heating thereof to prevent deformation.

4. The method as claimed in claim 3, including the step of treating the ends of the rod by heating them prior to the step of heating the entire rod and cooling the rod subsequent to the step of heating the entire rod.

References Cited in the file of this patent

UNITED STATES PATENTS

| | | |
|---|---|---|
| 1,051,035 | Voelker | Jan. 21, 1913 |
| 1,737,662 | Loepsinger | Dec. 3, 1929 |
| 1,969,658 | McIlvaine | Aug. 7, 1934 |
| 2,456,474 | Wainwright | Dec. 14, 1948 |
| 2,565,533 | Szegho | Aug. 28, 1951 |
| 2,723,362 | Gethmann | Nov. 8, 1955 |